T. S. PATTERSON.
WASHING MACHINE.
APPLICATION FILED FEB. 26, 1912.
1,193,600.
Patented Aug. 8, 1916.
5 SHEETS—SHEET 1.
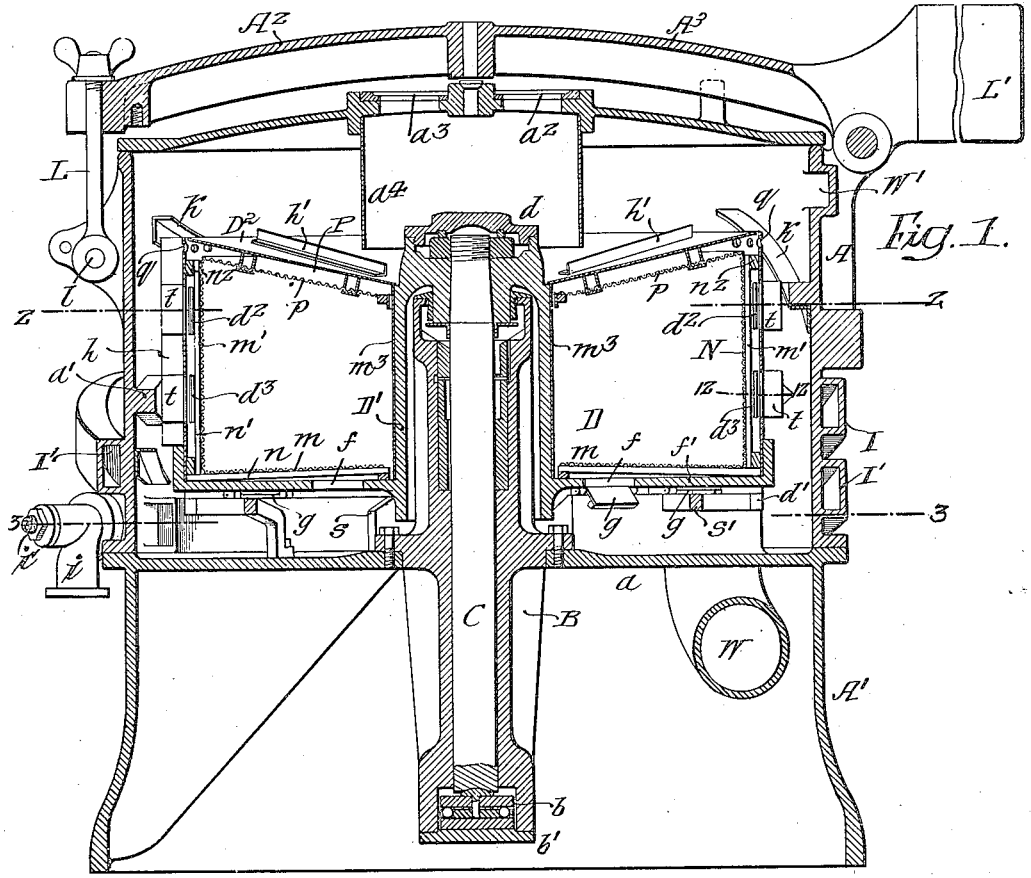
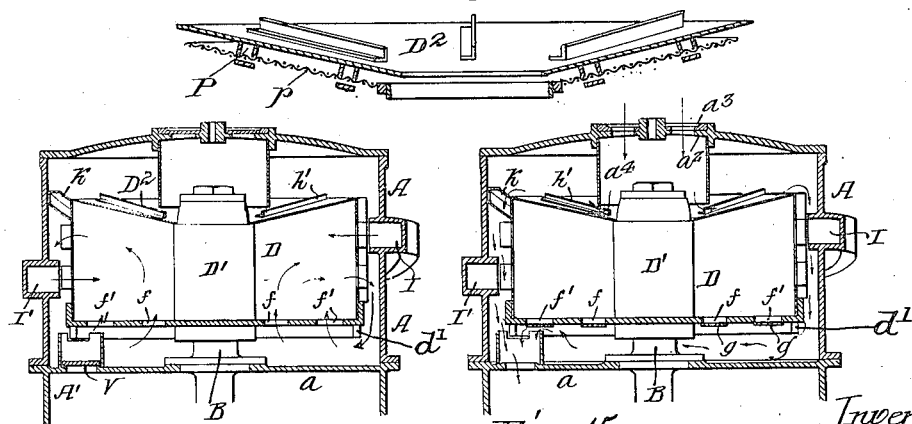
Witnesses
Walter S. Pullinger
Will A. Burrows
Inventor
Thomas S. Patterson
by his Attorneys
Howson & Howson

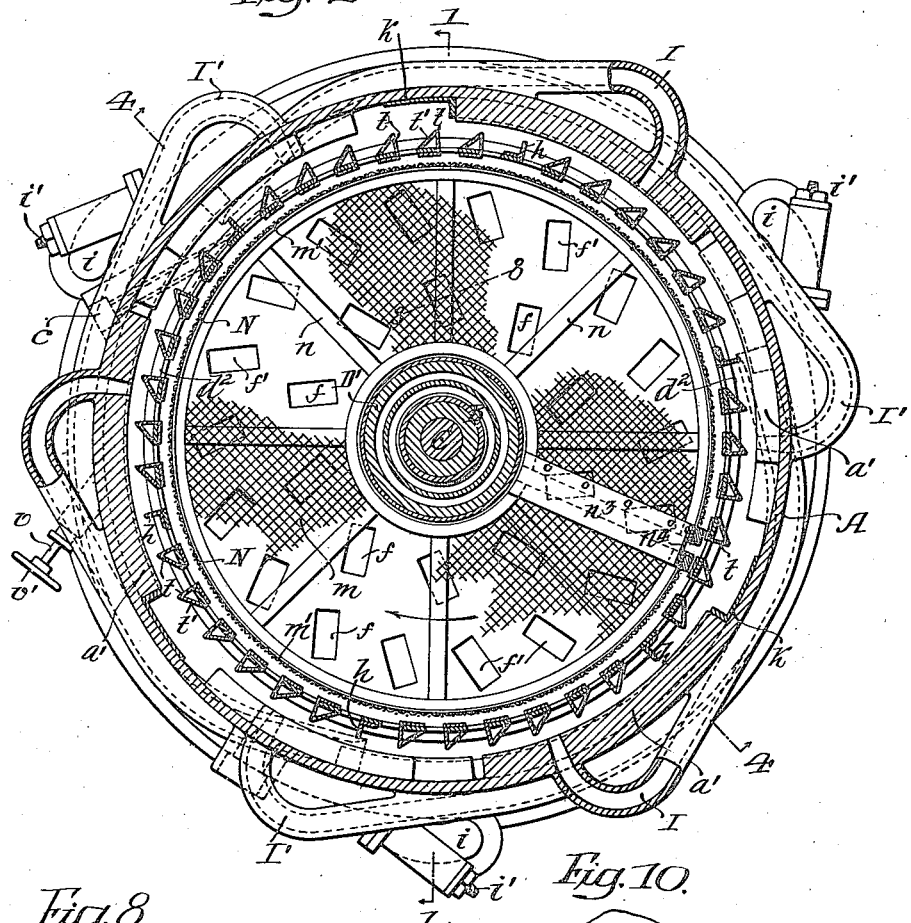

T. S. PATTERSON.
WASHING MACHINE.
APPLICATION FILED FEB. 26, 1912.

1,193,600.

Patented Aug. 8, 1916.
5 SHEETS—SHEET 3.

Witnesses.

Inventor.
Thomas S. Patterson.
by his Attorneys.
Howson & Howson

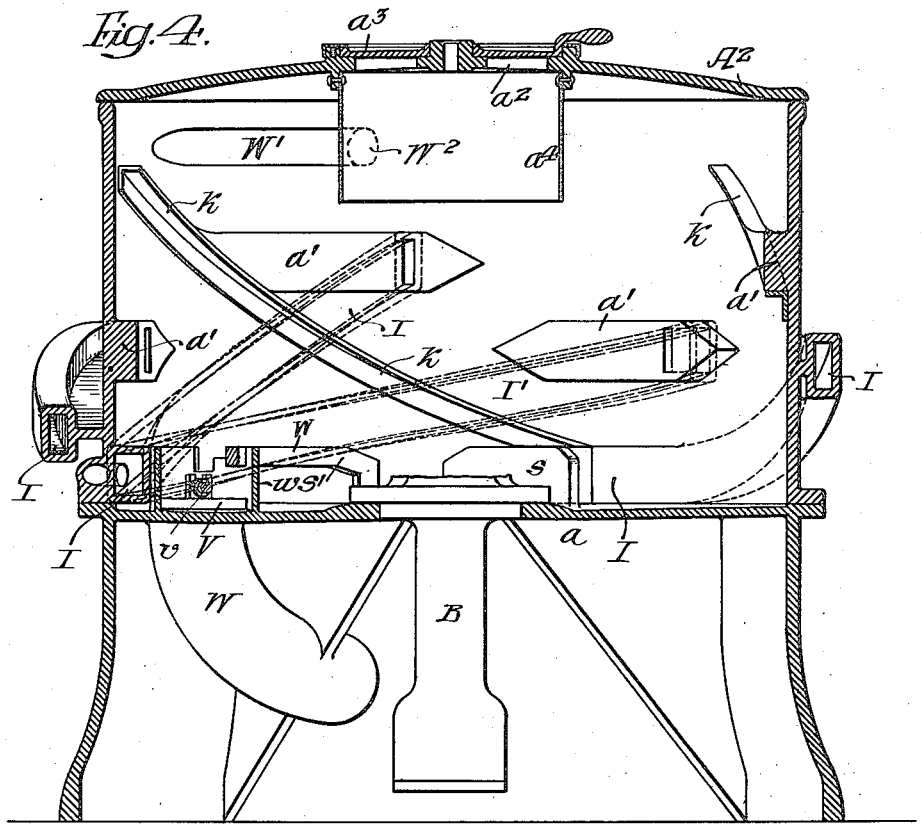
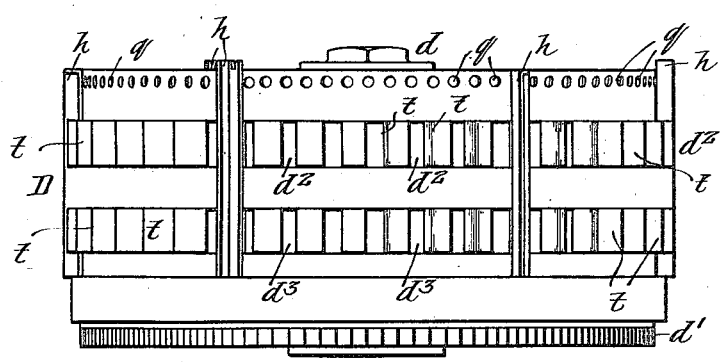

T. S. PATTERSON.
WASHING MACHINE.
APPLICATION FILED FEB. 26, 1912.
1,193,600.
Patented Aug. 8, 1916.
5 SHEETS—SHEET 5.
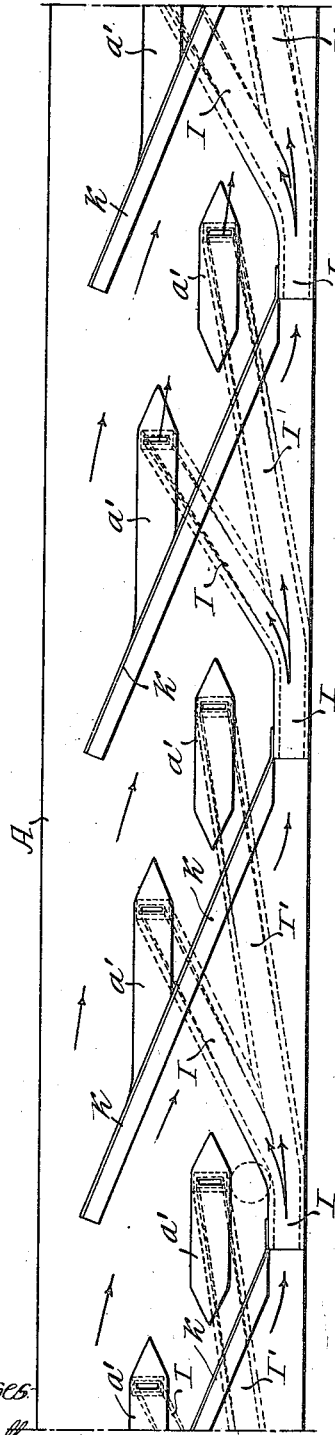
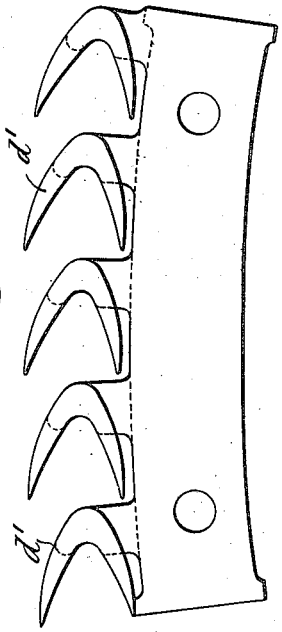
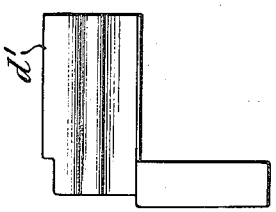
Inventor:—
Thomas S. Patterson,
by his Attorneys,—

UNITED STATES PATENT OFFICE.

THOMAS S. PATTERSON, OF ROSEMONT, PENNSYLVANIA.

WASHING-MACHINE.

1,193,600.　　　　　　Specification of Letters Patent.　　Patented Aug. 8, 1916.

Application filed February 26, 1912. Serial No. 679,932.

*To all whom it may concern:*

Be it known that I, THOMAS S. PATTERSON, a subject of the King of Great Britain and Ireland and the Isle of Man, residing in Rosemont, county of Montgomery, State of Pennsylvania, have invented certain Improvements in Washing-Machines, of which the following is a specification.

My invention relates to that type of washing machine in which the material, from which the dirt is to be removed, is rotated in a basket within an inclosed chamber and subjected to the action of water or other cleansing fluid.

One object of the present invention is to insure the proper circulation of water through the apparatus and through the material being washed and to utilize the impact of the water to agitate and to open the material being acted upon so that the water may gain access to all portions of said material without the use of blades or other positive devices which are more or less injurious to delicate fabrics.

A further object of the invention is to so construct the machine that by increasing the speed of rotation, cutting off the supply of water and opening the exhaust valve, it can be used as an extractor for removing the water from the material, which has been cleansed.

A still further object of the invention is to prevent the circulation of steam through the material during the extracting process.

Figure 3:
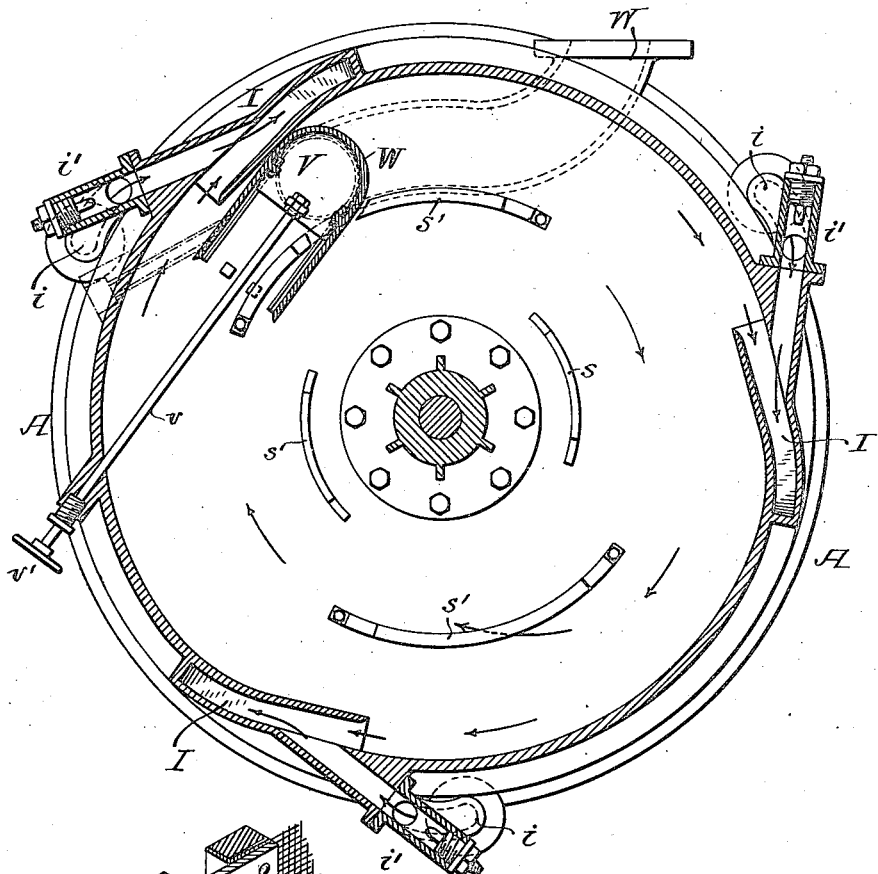
Figure 13:
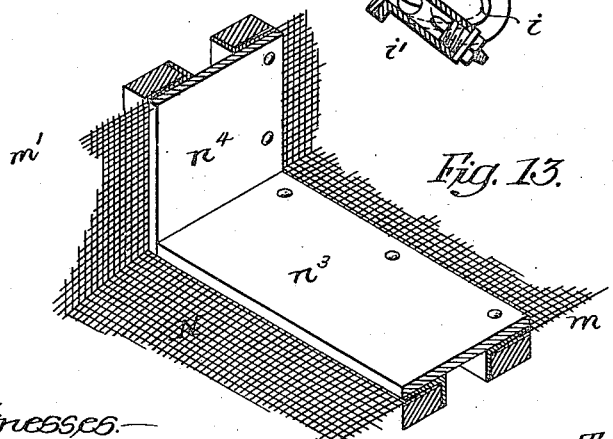

In the accompanying drawing: Figure 1, is a vertical sectional view of my improved washing machine and extractor on the line 1—1, Fig. 2; Fig. 1ª is a sectional view of the cover of the basket; Fig. 2, is a sectional plan view on the line 2—2, Fig. 1; Fig. 3, is a sectional plan view on the line 3—3, Fig. 1; Fig. 4, is a sectional view on the line 4—4, Fig. 2, with the basket removed; Fig. 5, is an extended view showing the openings in the casing; Fig. 6, is a view of one of the turbine segments; Fig. 7, is an end view of Fig. 6; Fig. 8, is a sectional view, on the line 8—8 Figs. 2 and 10 showing one of the weighted valves on the bottom of the basket open; Fig. 9, is a view similar to Fig. 8 showing the valve closed; Fig. 10, is a plan view showing the location of the valve; Fig. 11, is a detached view of the basket; Fig. 12, is a sectional plan view enlarged on the line 12—12 Fig. 1; Fig. 13, is a sectional perspective view showing the joint of the cage; and Figs. 14 and 15, are diagram views.

A is the cylindrical casing, as shown in the drawings, and this casing is mounted on a frame A', shaped in any suitable manner. The top of the frame, in this instance, forms the bottom $a$ of the washing chamber and mounted on this bottom portion $a$ is the standard B; supporting the vertical shaft C which carries the basket D. The standard B extends to a point near the floor and has a ball bearing $b$ for the lower end of the shaft. This ball bearing is held in place by a cap $b'$. The upper end of the standard B extends into the chamber in the ordinary manner and has bearings for the upper end of said shaft. The basket has a hollow center post D' of sufficient diameter to inclose the shaft and its standard and on the end of this center post is a socket to receive the tapered end of the shaft. An air tight joint is formed by a cap $d$ and a gasket. The detail construction of the bearings and the means for attaching the basket to the shaft may be modified without departing from the essential features of the invention. In the present instance, the basket has a series of segments provided with turbine blades $d'$ located under the bottom, and these blades are curved, as shown in the detached view Fig. 6, which illustrates one of the segments on which the blades are formed. The steam pipe $c$ is so located as to project the steam against the turbine blades and thus rotate the basket at the speed desired; the exhaust steam escaping in the chamber in which the basket is located.

In the wall of the basket are two series of openings $d^2$ and $d^3$, spaced apart as indicated and in the bottom of the basket are two series of openings $f$ and $f'$. The openings $f'$ are near the periphery of the basket; each opening, in the present instance being quadrangular in form and set at the angle clearly illustrated in Fig. 2. The object of providing these openings is to allow water under pressure to gain access to the interior of the basket at different points and open the material being washed.

I preferably locate on each side of the openings $d^2$—$d^3$ projecting ribs $t$. Each rib has an angle portion $t'$ forming a tapered passage leading to the opening $d^2$, by this construction a jet of water, after it has been projected, will be immediately cut off; giving the desired effect of the impact of the water on the material being washed and by tapering the rib the jet of water will be immediately transferred from one opening to another, as there are no flat surfaces for the jet to impinge upon.

Means is provided which will be hereinafter described in detail for closing the openings $f—f'$ in the bottom of the basket at intervals during the slow rotation of the basket when the washing operation is carried on. In the walls of the casing A are passages or conduits I, I' as clearly shown in Figs. 3 and 4, through which water is admitted under pressure to the casing. One set of passages leads to the point opposite one set of openings $d^2$ in the basket and another set of passages leads to the openings $d^3$ in the basket. These passages also communicate at their inlet end with the bottom of the chamber. The water passes from the chamber formed by the casing and through the passages I, I', as the basket rotates and additional water either heated or not may be added to this circulating water as desired. Thus there is a complete circulation in the basket and this circulation is so regulated that the water enters the basket first at one point and then at another in order to keep the material in motion and to expose every portion of the same to the cleansing action of the water.

In the present instance there are three distinct water inlets $i$ into each of which extends the steam nozzle $i'$ leading from any suitable steam supply and the steam from this nozzle projects the water into the passage I, which enters the chamber in line with the upper openings $d^2$ in the basket and also into the passage I' which communicates with the interior of the chamber on a line with the lower openings $d^3$ in the basket and the outlets of these passages are alternately arranged so that the material in the upper portion of the basket is first acted upon after which the material in the lower portion of the basket is acted upon and all of the material in the basket is kept in motion by the circulation through the passages as the basket is rotated.

The bottom openings $f, f'$ are closed by the valves $g$ pivoted at one side of the openings at $g'$, as shown in Figs. 8 and 10 and at the outer end of each valve is a weight $g^2$. When the basket is rotating slowly then the valves are open as in Fig. 8 and the water can freely flow through the openings and when the speed of rotation is increased then the valves will automatically close as in Fig. 9 due to centrifugal force which prevents the circulation of water through the openings. It is only necessary to circulate the water through the passages with or without steam when the basket is moving slowly, but when the basket is rotating rapidly then the water is driven from the material prior to the material being removed from the basket.

It will be noticed upon referring to Figs. 2 and 10, that the openings $f, f'$ at the bottom of the basket are arranged at an angle and are quadrangular in form. The basket rotates in the direction indicated by the arrow, Fig. 2 and the pivots for the valves $g$ are at the rear side of the opening. Each valve has a stop at the back so as to limit the opening of the valve to the angle illustrated in Fig. 8.

When the basket is traveling slowly, the valves are open and the water is picked up by the valves and forced into the basket, except when the valves are closed by the cams.

The weight is sufficient to hold the valves open against centrifugal force when the basket is rotating slowly, but when the rotation of the basket is increased for extracting, then the centrifugal force overcomes gravity and the valves close as in Figs. 9 and 10, as it will be noticed that the weight on the valves is farther away from the center of rotation when the valve is closed than when open. On the periphery of the basket is a series of vertical fins or blades $h$ by which the water between the basket and the casing is kept in active motion. On the cover $D^2$ of the basket are radial blades $h'$ for the same purpose.

Within the basket, in the present instance, is a cage N. This cage is made up of a series of bottom bars $n$ and vertical bars $n'$ spaced a given distance apart. These vertical bars are held together at the upper end by a ring $n^2$. The side of the cage is formed of wire gauze $m'$ and the bottom of the cage is also formed of wire gauze $m$ so that while the cage retains the material it allows for the free flow of water through the basket. Secured to the underside of the cover $D^2$ of the basket is a frame P to which the wire gauze lining $p$ is secured. The wire gauze is spaced from the cover so as to form a passage for the free flow of liquid.

I preferably make the cage split, as shown in Fig. 13 and provide an overlapping plate $n^3$ for the bottom portion $n^4$ for the vertical portion so that the joint will be covered. By this construction, the cage can be inserted freely in the basket and when rotated it can expand against the basket without straining any of the parts. I preferably incase the center post within a brass tubing $m^3$ shrunk on to the post.

Secured to the inner wall of the casing A are inclined blades $k$. These blades are set at an angle and the blades or fins $h$ on the basket are arranged vertically. The water as it is carried around by the action of the blades $h$ of the basket is caused to have a downward movement due to the inclined blades $k$ on the casing.

In order to prevent the water circulating through all of the bottom openings $f$—$f'$ in the casing at one time, I provide cams $s$—$s'$ for closing the valve $g$ during portions of the revolution of the basket. The cams $s$ act upon the valves $g$ of the openings $f$ and the cams $s'$ act upon the valves $g$ of the openings $f'$ so that as the basket is rotated first one set of openings and then the other set of openings—alternately, in the present instance, is closed, and while the water is circulating through certain portions of the basket the circulation in other portions of the basket is discontinued momentarily; the object being to keep the material in constant agitation without the use of blades or other devices which would injure the material, and, as before stated, the most delicate fabrics can be washed in a machine of this type. Communicating with the bottom of the casing is an exhaust pipe W, which is closed by a valve V having a valve stem $v$ extending through the casing and provided with a handle $v'$. The valve is a slide valve adapted to suitable ways and can be opened to any degree desired by moving the valve stem longitudinally. Surrounding the opening which communicates with the outlet W is a partition $w$, which extends to a point close to the bottom of the basket.

W' is the overflow opening which may communicate with the outlet pipe W or with any other suitable waste pipe.

Pivoted to the casing is an arm $A^3$ carrying a cover $A^2$. The arm has a counterbalance L' and is secured to the casing, in the present instance by a clamp bolt L pivoted to the casing at $l$ and arranged to enter a slot in the bar; a nut on the threaded portion of the bolt engages the bar and firmly secures the cover in the closed position. At the upper edge of the basket close to the cover are openings $q$ which are for the purpose of allowing the scum which rises from the material during the washing process to pass out of the cage and to form on the top of the water in the chamber. This scum can be drawn off through the overflow pipe either continuously or intermittently, as desired.

On the cover for the basket is a series of radial blades $h'$ mentioned above and depending from the cover $A^2$ of the casing is a shell $a^4$ which extends down to a point near the basket and in the cover are openings $a^2$ closed by a rotary valve $a^3$. The object of this construction is to allow air to enter through the casing when the water has been drawn off so as to prevent steam from entering the basket. The air is driven by the blades on the basket toward the inner wall of the casing and travels down the wall of the casing due to the inclined blades on the casing and as it circulates in the chamber due to the rotation of the basket, it is directed by the wall, which surrounds the outlet opening, through the outlet opening and away from the chamber—carrying with it any steam which may escape from the turbine jet and which was not condensed.

In order to stop the free flow of water through the side openings at the point where the water jets are projected from the water passages in the side walls of the casing, I form projecting blank walls $a'$, tapered at each end, as illustrated in Fig. 5, so that the water will not escape from the basket through the side openings when the openings are opposite these blank walls. This gives the water time to subside and stops circulation a moment before the water jet is projected so that the water jet does not have to reverse the flow in the basket, as well as agitate the material.

While I have described my invention as a washing machine using water, it will be understood that any liquid may be used for washing the material and the material being treated may be varied according to the use to which the invention is placed. The cleansing fluid may be plain water or a washing compound may be used without departing from the essential features of the invention.

The operation is as follows:—There may be as many cages as desired, and these cages are filled with material to be washed; the cover of the casing being removed, one of the cages is placed in the basket. The covers are then applied and water is allowed to enter through the water passages $i$. The steam valve controlling the turbine jet may be turned to the slow position and the basket will then be rotated as the chamber is being filled with water. The water will reach a given point above the basket and will overflow through the overflow passage W'. As the water accumulates in the basket the speed of the basket will be decreased to the normal washing speed; then steam is admitted through the several jets communicating with the passages I, I', so that water will be driven through these passages from the inlet pipes, as well as from the bottom of the casing and will be projected at intervals through the two series of openings in the basket at the same time the pivoted valves act as blades to force the water up through the openings in the bottom of the basket and the circulation is up through the material and out through the side openings which are not opposite the blank walls $a'$ adjoining the jet openings from the passages. This causes the material to rise and fall in the basket and to change position while the jets act upon the material at right angles to the flow and again change the position—keeping the material in motion and shifting its position throughout the entire time that it is being washed. The water and steam inlet pipes may be closed, then the water will circulate over and over again in the chamber and through the basket.

The soap will tend to rise to the top and carry with it the dirt removed from the material and this flows out through the upper portions of the basket and forms a scum on the surface of the water. This scum is drawn off through the overflow pipe after the material has been washed for a given length of time.

It will be understood that after the water has been injected into the chamber of the casing, the water and steam inlets may be cut off and the circulation maintained by the rotation of the basket and the flow of water through the passages in the side walls of the casing, as the water will circulate with sufficient velocity to cause the water escaping from the passages to be forced into the basket and agitate the material contained therein. To extract the water the circulating steam pipes are closed, as well as the water pipes and the exhaust valve is opened allowing the water to flow to waste. Then the valve controlling the turbine jet is open to the full position to allow a certain amount of steam to enter and drive the basket at a higher speed for the purpose of extracting the water from the material. The valves $g$, $g'$ at the bottom openings $f$, $f'$ close automatically as the speed of rotation of the basket increases, due to centrifugal force.

In order to prevent steam entering the basket and circulating through the chamber, I open the valve $a^3$ in the cover of the machine so as to allow air to be drawn into the shell and to be driven down by the action of the blades and to carry with it any steam which may tend to accumulate in the basket and as the outlet is still open this air will be carried away from the machine. As I use cold air it will gradually cool the machine and the material under treatment and tend to condense the steam as it leaves the turbine. After a given length of time, the machine is stopped and the cage, with the cleansed material, is removed from the basket and another loaded cage inserted in its place; the above operation being repeated.

I claim:—

1. The combination in a washing machine, of a casing; a rotating basket mounted on a vertical axis and rotated within the casing; means for rotating the same, said basket having openings in its side walls and having inclined guides between the openings for directing the water therethrough, said casing having conduits opening into the interior of the casing and registering with the openings in the side walls of the basket; and means for causing the water to discharge into and through the openings in the basket.

2. The combination in a washing machine, of a casing; a rotating basket located within the casing; means for rotating the same, said basket having openings in its side wall, said casing having conduits opening into the interior thereof and registering with the openings in the basket; and means for discharging water through the conduits, said water being projected from the conduits and through the openings in the side wall of the basket and into the basket, said basket having openings in the bottom through which the water circulates.

3. The combination of a casing; a basket within the casing; means for rotating the basket, said basket having two sets of openings in its side wall, one set located above the other set; two series of conduits in the casing having outlet openings, one set of conduits registering with the upper set of openings in the side wall of the basket and the other set of conduits registering with the lower set of openings in the basket so that, as the basket is rotated, the material therein will be agitated first by water projected through one set of openings and then through the other set of openings.

4. The combination in a washing machine, of a casing; a basket within the casing; means for supporting the basket; means for rotating the basket, said basket having a series of openings in its side wall; and a series of openings in its bottom, said casing having conduits opening into the chamber at intervals and registering with said openings in the basket; a valve at each bottom opening of the basket, said valves depending from the bottom of the basket so that, as the basket rotates, water will be projected at intervals into the basket through the side openings and will be projected through the bottom openings by the action of the valves in order that the material in the basket may be constantly agitated.

5. The combination in a washing machine, of a casing; a basket within the casing; a central support in the basket; means for rotating the basket, said basket having a series of openings in its side wall and a series of openings in its bottom, the casing having conduits opening into the chamber in which the basket is located and registering with the said openings in the basket; a valve in each bottom opening of the basket and depending from the bottom of the basket; cams in the bottom of the casing arranged to close the valves during a certain portion of the revolution of the basket; and means for causing the water to circulate through the conduits so that, as the basket is rotated, the material therein will be agitated first by water projected through the side openings and then by water projected through the openings in the bottom of the basket.

6. The combination of a casing; a basket in the chamber formed by the casing, said basket having openings in its side wall and openings in its bottom; means for rotating the basket; means for supplying water to the casing and to project it into the side openings of the basket; and a weighted valve at each bottom opening, so pivoted that the valves will remain open when the basket is driven slowly, but when it is driven at an increased speed the valves will automatically close due to centrifugal force.

7. The combination of a casing forming a chamber; a basket rotatably mounted in the casing; means for rotating the basket, said basket having two series of openings in its side wall and two series of openings in its bottom; a water inlet pipe; and two conduits leading from the said pipe, one of said conduits opening into the chamber and registering with one set of openings in the side wall of the basket and the other passage opening into the chamber and registering with the other set of openings in the side wall of the basket.

8. The combination of a casing forming a chamber; a basket rotatably mounted in the casing; means for rotating the basket, said basket having two series of openings in its side wall and two series of openings in its bottom; a water inlet pipe and two conduits leading from the said pipe, one of said conduits opening into the chamber and registering with one set of openings in the side wall of the basket and the other conduit opening into the chamber and registering with the other set of openings in the side wall of the basket, the two conduits communicating at the lower ends with the chamber at the bottom of the casing; and a nozzle for supplying steam or other fluid under pressure to project water through both conduits and to draw water from the lower portion of the casing.

9. The combination in a washing machine, of a casing inclosing the washing chamber; a rotatable basket located within the chamber; means for rotating the same, said basket having a series of openings in its side wall and a series of openings in its bottom; valves projecting from the bottom of the basket and located at each bottom opening; means for supplying streams of water through the side openings in the basket; vertically arranged blades secured to the periphery of the basket; and inclined blades on the inner wall of the casing, said blades acting to circulate the water between the casing and the basket as the said basket rotates.

10. The combination in a washing machine, of a casing; a basket located in the casing; means for rotating the basket, said basket having a series of openings in its side wall and a series of openings in the bottom; a water inlet pipe; a conduit in the casing leading from the water pipe to the interior of the casing at a point opposite the openings in the basket; a steam nozzle located in the conduit and arranged to carry the water under pressure from the water pipe and to project it through the conduit into the interior of the casing and through the openings in the side wall of the basket, said conduit also communicating with the lower portion of the chamber in which the basket is located, whereby the water is circulated through the chamber, basket and conduit.

11. The combination in a washing machine, of a casing; a basket having a series of blades; a steam pipe arranged close to the periphery of the basket in line with the blades so as to rotate said basket; an outlet for the water and steam at the base of the casing; an air inlet at the upper end of the casing; means for closing the said inlet; and blades for circulating the air downward after it enters the casing.

12. The combination in a washing machine, of a casing; a basket rotatably mounted in the casing and having a series of blades at its periphery; a steam pipe in line with the blades so that, when steam is projected from the pipe, it will impinge upon the blades and will turn the basket, said casing having water inlet conduits; a valved outlet at the bottom of the casing; a cover for the basket; radial blades on the cover; a cover for the casing having an inlet opening; a shell extending from the cover of the casing close to the cover of the basket; and a deflecting partition at the bottom of the casing near the outlet opening.

13. The combination in a washing machine, of a casing having a central standard; a basket mounted to rotate freely on the standard and having a series of blades at the bottom near the periphery; a steam nozzle extending through the casing in close proximity to the blades, the basket having a series of openings in the bottom and a series of openings in the side wall; pivoted valves hung from the bottom of the basket at one side of each opening and arranged at an angle; a cam projecting from the bottom of the casing and arranged to positively close the valves at intervals; conduits opening into the interior of the casing at the bottom and at a point some distance above the bottom and in line with the openings in the side wall of the basket; means for circulating water in the conduits; a cover for the basket; and an overflow outlet in the casing above the basket so that the basket will be submerged during the washing process.

14. The combination of a casing; a basket mounted in the casing; means for rotating the basket, said basket having a series of large openings in its side wall and a series of openings in the bottom; depending flanges for closing the bottom openings; cams in the bottom of the casing for closing the valves during a certain portion of the revolution; water conduits in the side wall of the casing; means for causing the water to flow through the said conduits; the openings in the conduits registering with the large openings in the side wall of the basket, the conduits being spaced apart so that the normal circulation will be up through the bottom openings in the basket and out through the side openings, except when the circulation is momentarily reversed by the water flowing in through the side conduits in the casing.

15. The combination of a casing; a basket rotatably mounted in the casing; means for circulating water in the basket, said basket having a series of openings in its side wall near the upper end; an overflow pipe in the casing at the water line and above the top of the basket so that as the basket rotates the scum formed by the dirt and soap will pass out of the basket through the openings in the side wall thereof and will accumulate on the surface of the water in the casing in order to be drawn off through the overflow pipe.

16. The combination of a casing; a basket; means for rotating the basket in the casing, said basket having a series of openings in the bottom; a valve for each opening; said valves being suspended from the under side of the basket; a cam in the casing for closing the valves at intervals, the valves being hung at the rear end of the openings so that as the basket rotates the valves will draw the liquid into the basket when said basket is traveling at a low speed and will close the openings when the basket is traveling at a high speed.

17. The combination in a casing, of a basket; means for rotating the basket, said basket having a series of enlarged openings in the side wall and a series of openings in the bottom; a series of inlet conduits in the side wall of the casing for water; means for forcing the water through the conduits; and an extension on the interior of the casing at the opening of each conduit, said extension projecting to a point near the basket so that as the basket rotates the circulation of water will be momentarily stopped before being reversed by the action of the incoming water.

18. The combination of a casing; a rotating basket mounted within the casing; means for supplying the casing with water; an outlet pipe in the bottom of the casing; a sliding valve for closing the said outlet pipe; and a partition projecting from the bottom of the casing to a point near the bottom of the basket and partly surrounding the valve so as to direct steam and water into the exhaust pipe and to prevent it from circulating in the basket.

19. The combination of a casing; a basket rotatably mounted in the casing and having an opening in the bottom and in the side wall and a series of openings at the top of the side wall; a cage mounted within the basket; a closed cover for the basket, said cover having a wire gauze partition located some distance from the cover, the space between the partition and the cover communicating with the upper series of openings in the basket.

20. The combination in a washing machine, of a casing; a basket mounted in the casing; means for rotating the basket, said basket having openings in the side wall, the casing having a series of conduits cast integral therewith; and steam pipes communicating with the conduits, the conduits communicating with the bottom of the casing and discharging at a point opposite the openings in the basket so that as the basket is rotated the water will be circulated through the conduits and through the basket.

21. The combination in a washing machine, of a casing; a basket located within the casing; means for rotating the basket, said basket having openings in the bottom and in the side wall; means for causing the water to circulate up through the bottom of the basket and out through the side wall; a conduit for water under pressure opening into the casing in a line with the openings in the basket so that a jet of water will be intermittently projected into the circulating water within the basket in a direction opposite to the direction of circulation, whereby the material being washed will be agitated and opened.

22. The combination in a washing machine, of a casing; a basket located within the casing, said basket having openings in its bottom and side wall; means for rotating said basket; conduits in the side wall of the casing communicating with the bottom of the chamber formed in the casing and also with the chamber some distance above the bottom so that as the water circulates, due to the rotation of the basket, a portion of the water will be forced through the conduits and discharged into the basket through the side openings therein.

In testimony whereof, I have signed my name to this specification, in the presence of two subscribing witnesses.

THOMAS S. PATTERSON.

Witnesses:
 CLYDE T. MOYER,
 WM. A. BARR.